(12) United States Patent
Miyamoto

(10) Patent No.: US 6,427,814 B1
(45) Date of Patent: Aug. 6, 2002

(54) LIQUID-ENCAPSULATED DAMPER MOUNT

(75) Inventor: Yasuo Miyamoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/249,861

(22) Filed: Feb. 16, 1999

(30) Foreign Application Priority Data

Feb. 16, 1998 (JP) .......................................... 10-032621

(51) Int. Cl.[7] ................................................. F16F 9/00
(52) U.S. Cl. ............ 188/321.11; 267/220; 280/124.147
(58) Field of Search ........................... 188/321.11, 378, 188/379; 267/220, 140.11, 140.12, 140.13, 141.2; 280/124.147, 124.155

(56) References Cited

U.S. PATENT DOCUMENTS

| 4,733,854 A | * | 3/1988 | Miyamoto | 267/140.11 |
| 5,024,461 A | * | 6/1991 | Miyakawa et al. | 280/124.147 |
| 5,040,775 A | * | 8/1991 | Miyakawa | 267/220 |
| 5,064,176 A | * | 11/1991 | Goto | 267/140.11 |
| 5,133,573 A | * | 7/1992 | Kijima et al. | 267/220 X |
| 5,277,410 A | * | 1/1994 | Oshima et al. | 267/220 |
| 5,356,121 A | * | 10/1994 | Ikeda | 267/140.12 |

FOREIGN PATENT DOCUMENTS

JP       7-49098       11/1995

* cited by examiner

Primary Examiner—Pam Rodriguez
(74) Attorney, Agent, or Firm—Arent Fox Kintner Plotkin & Kahn, PLLC

(57) ABSTRACT

A liquid-encapsulated damper mount includes an outer member fixed to a vehicle body, and an inner member fixed to an upper end of a damper. The outer member and the inner member are connected to each other by first, second and third elastomer members. A first liquid chamber defined between the first and second elastomer members communicates with a second liquid chamber defined between the second and third elastomer members through a restriction. The restriction is defined in mating surfaces of the inner member and a ring member which are made of a metal and hence, even if the second elastomer member is deformed in any manner, the cross-sectional area of the restriction is not changed. Thus, when a load of a very low speed is inputted from a road surface, a stable damping force can be generated in the liquid-encapsulated damper mount, thereby preventing the resonance of an unsprung portion to enhance the riding comfort during traveling of a vehicle on a flat road.

17 Claims, 15 Drawing Sheets

$K_1$; STATIC SPRING CONSTANT COMPONENT OF FIRST ELASTOMER MEMBER $K_2$; STATIC SPRING CONSTANT COMPONENT OF SECOND ELASTOMER MEMBER $A_1K_1$; EXPANDED SPRING CONSTANT COMPONENT OF FIRST ELASTOMER MEMBER $A_2A_2$; EXPANDED SPRING CONSTANT COMPONENT OF SECOND ELASTOMER MEMBER

LIQUID-ENCAPSULATED DAMPER MOUNT

BACKGROUND OF THE INVENTION

1. Field of the Invention

The present invention relates to a liquid-encapsulated damper mount for supporting, on a vehicle body, an upper end of a damper which suspends a wheel of the vehicle.

2. Description of the Related Art

A liquid-encapsulated damper mount is already known from Japanese Utility Model Publication No. 7-49098. FIG. 14 shows the structure of the above known liquid-encapsulated damper mount. An inner member or shell 01 fixed to an upper end of a damper (not shown) and an outer member or shell 02 fixed to a vehicle body (not shown), are connected to each other by a first elastomer member 03 and a second elastomer member 04, thereby defining a liquid chamber 05 having a non-compressible liquid encapsulated therein, between the first and second elastomer members 03 and 04. A partition member 06 is disposed within the liquid chamber 05, and the liquid chamber 05 is divided into an upper chamber portion 08 and a lower chamber portion 09 through a restriction 07 defined between an outer peripheral surface of the partition member 06 and an inner peripheral surface of the first elastomer member 03.

When the inner member 01 and the outer member 02 are moved relative to each other by a load transmitted from the wheel via the damper to the liquid-encapsulated damper mount to deform the first and second elastomer members 03 and 04, the volumes of the upper and lower chamber portions 08 and 09 are alternately increased and decreased, whereby the liquid is reciprocally moved through the restriction 07. In this case, the dynamic spring constant at middle and higher frequency ranges can be reduced by the liquid column resonance effect generated in the restriction to contribute to a reduction in load noise.

When a load at a very low speed (e.g., 0.03 m/sec or less) is inputted from the wheel to the damper during traveling of the vehicle on a relatively flat paved road surface, the friction between a piston and a cylinder of the damper is unstable under the influence of the individual differences in oil seals or a change in oil seal with the passage of time, thereby resulting in a problem in that sufficient damping is not obtained in a hydraulic valve of the damper, and an unsprung portion of the vehicle suspension causes a resonance which degrades the riding comfort. In other words, if the friction component of the damper has a large value in FIG. 15 which is a model diagram of the vibration system including the damper and the liquiden-capsulated damper mount in combination, when the load of the very low speed is inputted, a damping component (a dash pot component) caused by the passage of working oil through the hydraulic valve of the damper can not be generated in a normal fashion, thereby providing a degradation in riding comfort.

It is conceived that when the load of the very low speed is inputted, a damping force is generated by the liquid-encapsulated damper mount rather than by the damper. For this purpose, the cross-sectional area of the restriction of the liquid-encapsulated damper mount may be set at a sufficient small value, and a damping component may be generated when the liquid flows through the restriction.

However, the prior art liquid-encapsulated damper mount shown in FIG. 14 suffers from the following problem: The restriction 07 is defined by the clearance between the outer peripheral surface of the partition member 06 and the inner peripheral surface of the first elastomer member 03, and when a load from the damper is inputted in an oblique direction, the contact between the outer peripheral surface of the partition member 06 and the inner peripheral surface of the first elastomer member 03 must be avoided. For this reason, it is difficult to decrease the cross-sectional area of the restriction 07.

SUMMARY OF THE INVENTION

Accordingly, it is an object of the present invention to ensure that when a load of a very low speed is inputted from a road surface, a sufficient damping force is generated in the liquid-encapsulated damper mount, thereby enhancing the riding comfort during traveling of the vehicle on a flat road.

To achieve the above object, according to a first aspect and feature of the present invention, there is provided a liquid-encapsulated damper mount comprising an outer member fixed to a vehicle body, an inner member fixed to an upper end of a damper which suspends a wheel of a vehicle, an elastomer member connecting the inner member and the outer member for supporting the upper end of the damper on the vehicle body. A first liquid chamber and a second liquid chamber are defined within the elastomer, to communicate with each other through a restriction, the restriction being defined to penetrate one of an inside of a rigid member and an inside of the elastomer member.

With the above arrangement, the restriction interconnecting the first and second liquid chambers defined within the elastomer member of the liquid-encapsulated damper mount, is defined to penetrate the inside of the rigid member or the inside of the elastomer member. Therefore, even if the cross-sectional area of the restriction is set at a sufficiently small value, so that a damping force corresponding to the inputting of a load of a very low speed is generated, the cross-sectional area of the restriction can be prevented from being changed by the load, whereby a stable damping force is generated to enhance the riding comfort during traveling of the vehicle on a flat road.

The rigid member is, for example, a member formed from a metal or a hard synthetic resin, i.e., may be any material, if the material is not deformed by inputting of a load.

According to a second aspect and feature of the present invention, the rigid member comprises the inner member and a ring member which is fitted over an outer periphery of the inner member and connected to an inner periphery of the elastomer member. The restriction is defined in abutting faces of the inner member and the ring member.

With the above arrangement, the restriction is defined in the abutting faces of the inner member and the ring member. Therefore, the restriction can be easily formed by the step of only defining a groove in at least one of the inner member and the ring member and moreover, a special member for defining the restriction is not required, leading to a reduction in number of parts.

According to a third aspect and feature of the present invention, a system loss factor is set, such that the loss factor has a peak value when the frequency of vibration inputted from the wheel is in the vicinity of the natural frequency of an unsprung portion of a suspension.

With the above arrangement, when the frequency of vibration inputted from the wheel becomes a value in the vicinity of the natural frequency of the unsprung portion of the suspension, the value of the loss factor is peaked to generate a larger damping and hence, the resonance of the suspension can be prevented, to thereby enhance the riding comfort.

The term "loss factor tan δ" is defined as a tangent of a loss angle between the stress and the strain of a system which is being forcibly vibrated. The vicinity of the natural frequency of the unsprung portion of the suspension is defined to indicate a range of 0.7 $f_0$ to 1.4 $f_0$, wherein $f_0$ represents the natural frequency.

According to a fourth aspect and feature of the present invention, a stopper for limiting the maximum relative displacement of the outer member and the inner member is formed integrally with the elastomer member.

With the above arrangement, since the stopper for limiting the maximum relative displacement of the outer member and the inner member is formed integrally with the elastomer member, the number of parts can be reduced, as compared with the case where the stopper is provided separately from the elastomer member.

The above and other objects, features and advantages of the invention will become apparent from the following description of the preferred embodiments taken in conjunction with the accompanying drawings.

BRIEF DESCRIPTION OF THE DRAWINGS

FIG. 1 is a perspective view of a rear suspension of a vehicle.

FIG. 2 is an enlarged cross-sectional view taken along a line 2—2 in FIG. 1.

FIG. 3 is a cross-sectional view taken along a line 3—3 in FIG. 2.

FIG. 4 is a model diagram of the vibration system of a damper including a liquid-encapsulated damper mount.

FIG. 5 is a model diagram of the vibration system of the liquid-encapsulated damper mount.

FIG. 6 is a graph showing the relationship between the input frequency and the loss factor for the liquid-encapsulated damper mount.

DETAILED DESCRIPTION OF THE PREFERRED EMBODIMENTS

A first embodiment of the present invention will now be described with reference to FIGS. 1 to 6.

Figure 1:
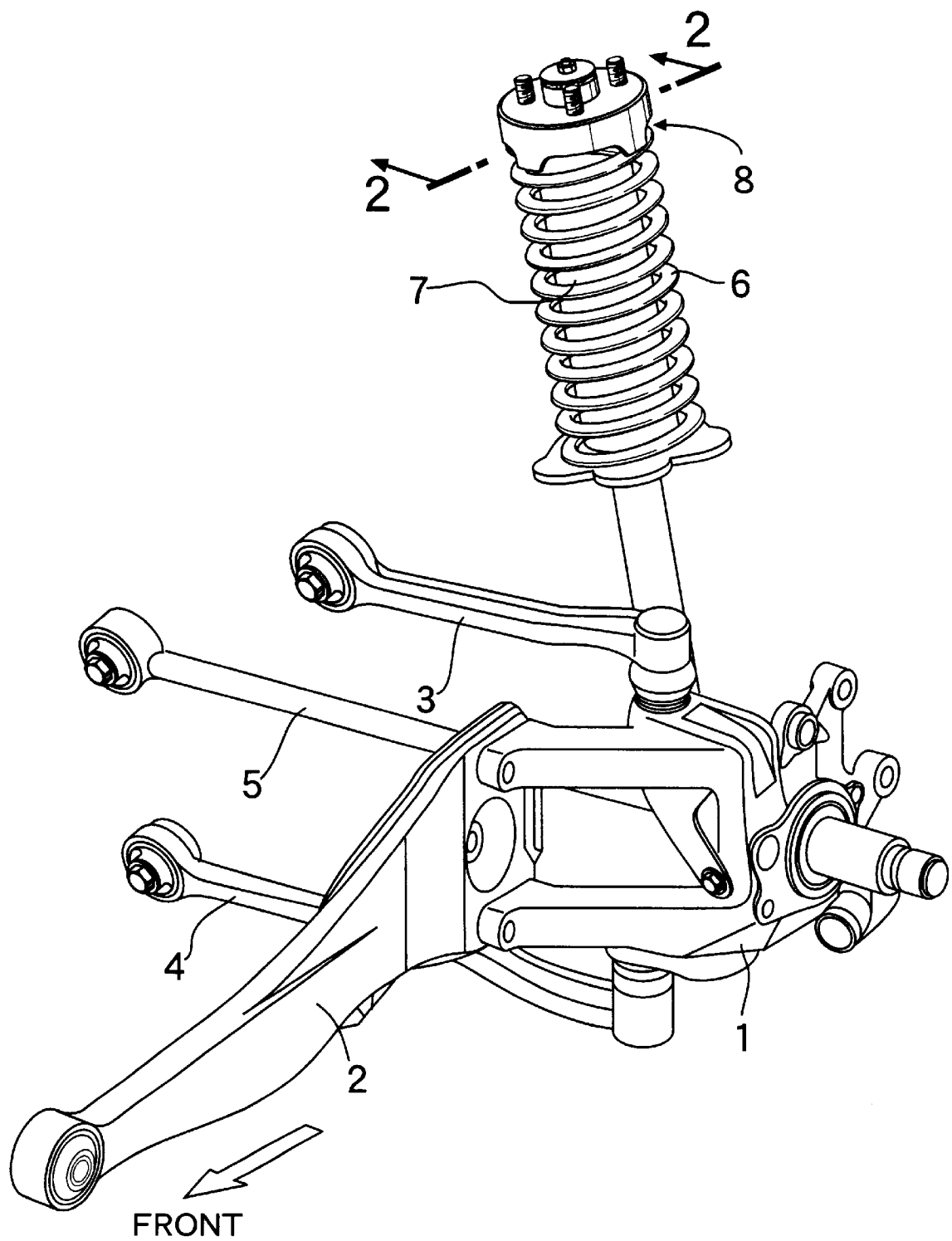
FIGS. 1 to 6 show a first embodiment of the present invention.

FIG. 1 shows a suspension for a left rear wheel of a vehicle. A knuckle 1 rotatably supporting a wheel which is not shown, is connected to a vehicle body by a radial rod 2 extending forwards and also by an upper arm 3, a front lower arm 4 and a rear lower arm 5, which extend laterally. The vertical movement of the knuckle 1 is buffered by a damper 7 integrally provided with a damper spring 6. The well-known damper 7 is adapted to generate a flow of a liquid by a cylinder and a piston which are moved relative to each other in response to the vertical movement of the knuckle 1, and to generate a damping force by the resistance force when the liquid passes through a hydraulic valve having a restriction. The damper 7 is supported at its upper end on the vehicle through a liquid-encapsulated damper mount 8.

The structure of the liquid-encapsulated damper mount 8 will be described below with reference to FIGS. 2 and 3.

The liquid-encapsulated damper mount 8 includes an outer member 11 formed from a metal plate by pressing, and an pipe-shaped inner member 12 coaxially disposed within the outer member 11. The outer member 11 and the inner member 12 are connected to each other by a first elastomeric member 13, a second elastomeric member 14 and a third elastomeric member 15, all of which are made of rubber or other similar material.

The outer member 11 includes a peripheral wall 16 surrounding an outer periphery of the inner member 12, and a flange portion 17 extending radially outwards from the peripheral wall 16. The outer member 11 is fastened by three bolts 18 embedded in the flange portion 17 which pass through the vehicle body 19 and by nuts 20. The damper spring 6 is supported at its upper end on a lower surface of the flange portion 17 through a spring seat 21. A mounting shaft 23 extending upwards from an upper end face of a cylindrical damper body 22, passes through the inner member 12 and a disk-shaped stopper plate 24 and is fastened by a nut 25 threadedly engaged with external threads formed at an upper end of the mounting shaft 23.

Inner and outer peripheral surfaces of the first elastomer member 13 are adhered by vulcanization to an outer peripheral surface of the inner member 12 and an inner peripheral surface of the outer member 11, respectively, with a lower surface of the first elastomer member 13 abutting against the upper end face of the damper body 22. The second elastomer member 14 located above the first elastomer member 13, includes ring members 26 and 27 adhered by vulcanization to its inner and outer peripheral surfaces, respectively. The ring member 26 is fixed to the outer peripheral surface of the inner member 12 by press-fitting, and the ring member 27 is fixed to the inner peripheral surface of the outer member 11 by press-fitting. The third elastomer member 15 comprises a diaphragm located above the second elastomer member 14 having ring members 28 and 29 adhered to its inner and outer peripheral surfaces by vulcanization. The ring member 28 is fixed to the outer peripheral surface of the inner member 12 by press-fitting, and the ring member 29 is fixed to the upper end of the peripheral wall 16 of the outer member 11 by caulking. A stopper member 30 of rubber, is fixed to a peripheral edge of a lower surface of the stopper plate 24 by vulcanization, and abuts against an upper surface of the ring member 29 of the third elastomer member 15.

Thus, a first liquid chamber 31 is defined between an upper surface of the first elastomer member 13 and a lower surface of the second elastomer member 14, and a second liquid chamber 32 is defined between an upper surface of the second elastomer member 14 and a lower surface of the third elastomer member 15. A non-compressible liquid such as ethylene glycol and a viscous silicone oil is encapsulated in each of the first and second liquid chambers 31 and 32. Four grooves are axially defined at distances of 90° in the inner peripheral surface of the ring member 26 of the second elastomer member 14, and the first and second liquid chambers 31 and 32 communicate with each other by four restrictions 33 defined by the grooves and the outer peripheral surface of the inner member 12. A notch 30, is defined in the stopper 30 abutting against the upper surface of the ring member 29 of the third elastomer member 15 in order to permit a space defined between the upper surface of the third elastomer member 15 and the lower surface of the stopper plate 24 to be put into communication with the outside air.

Figure 2:
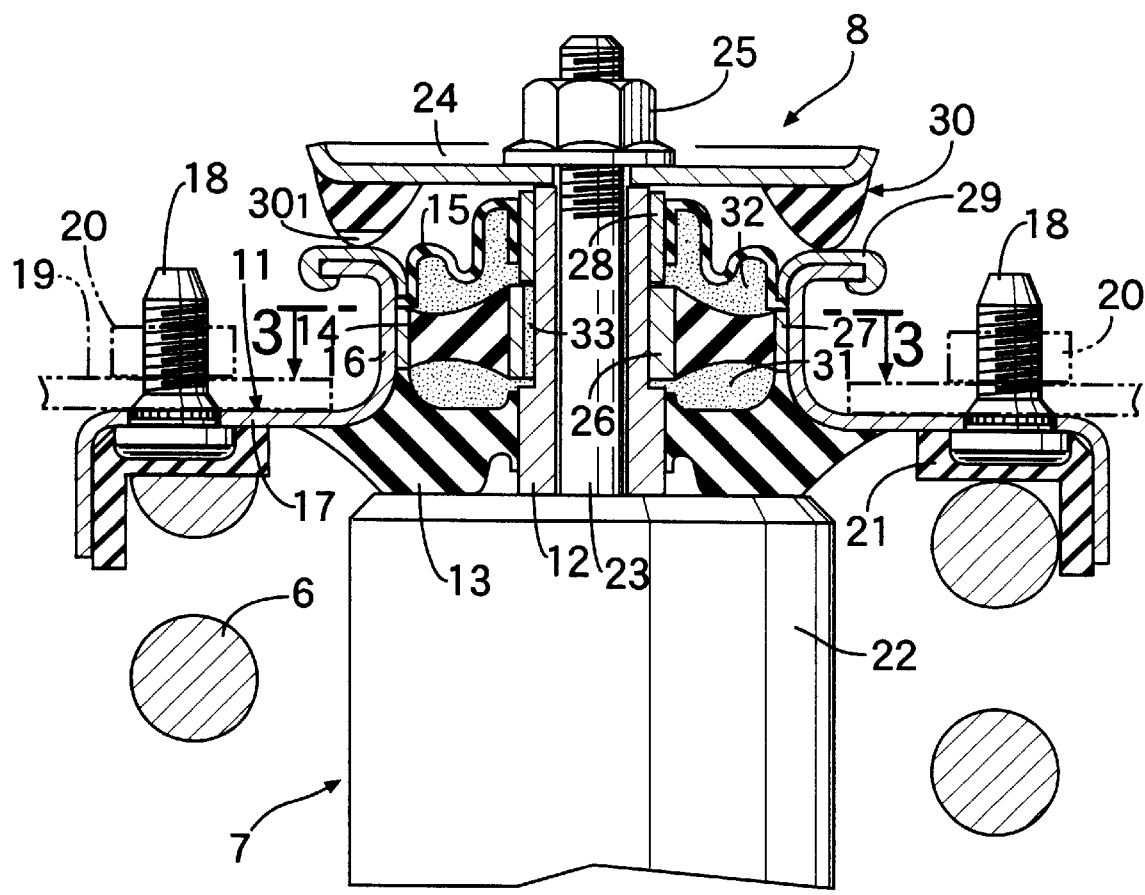
Figure 3:
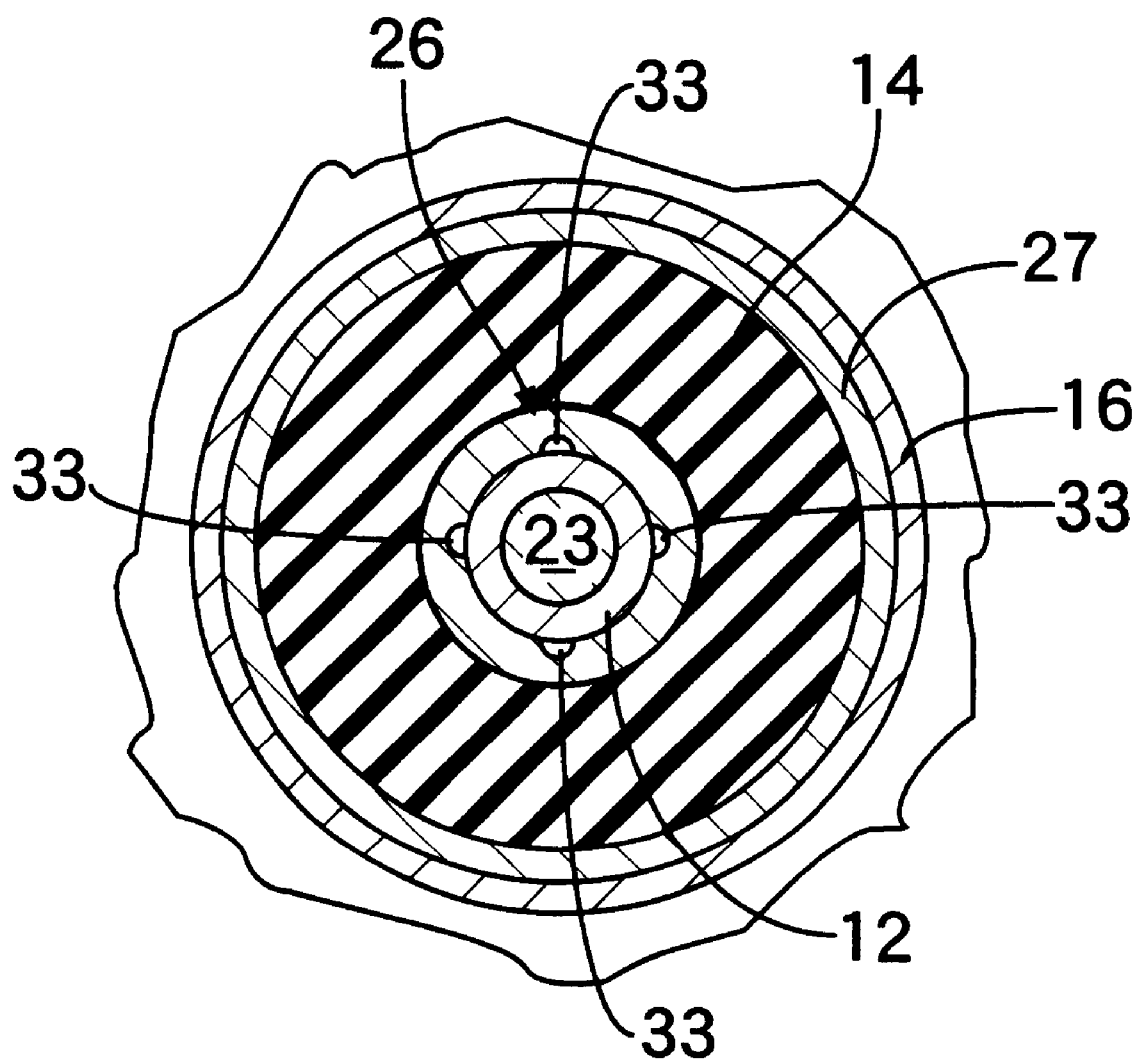
Figure 4:
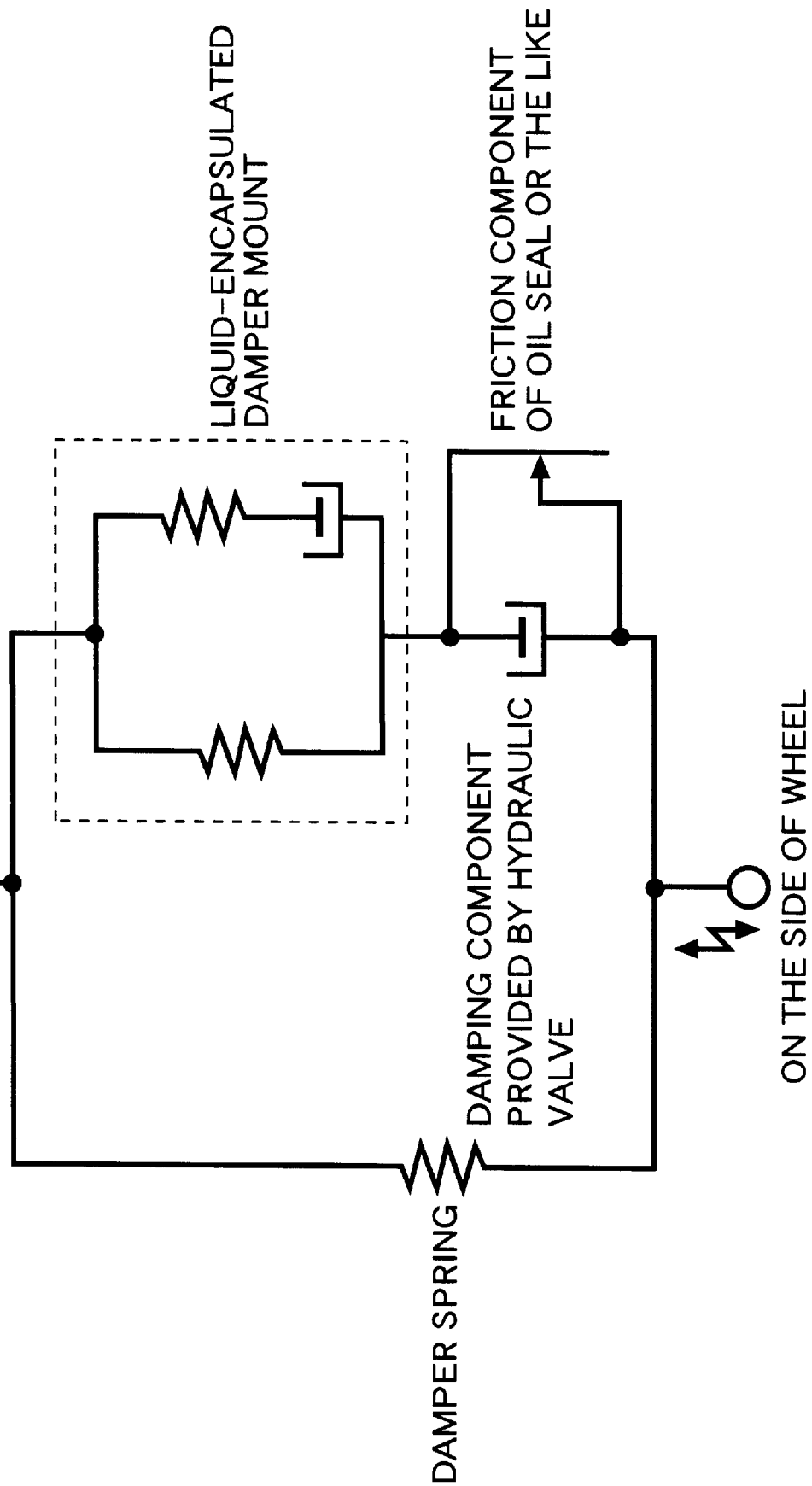
Figure 5:
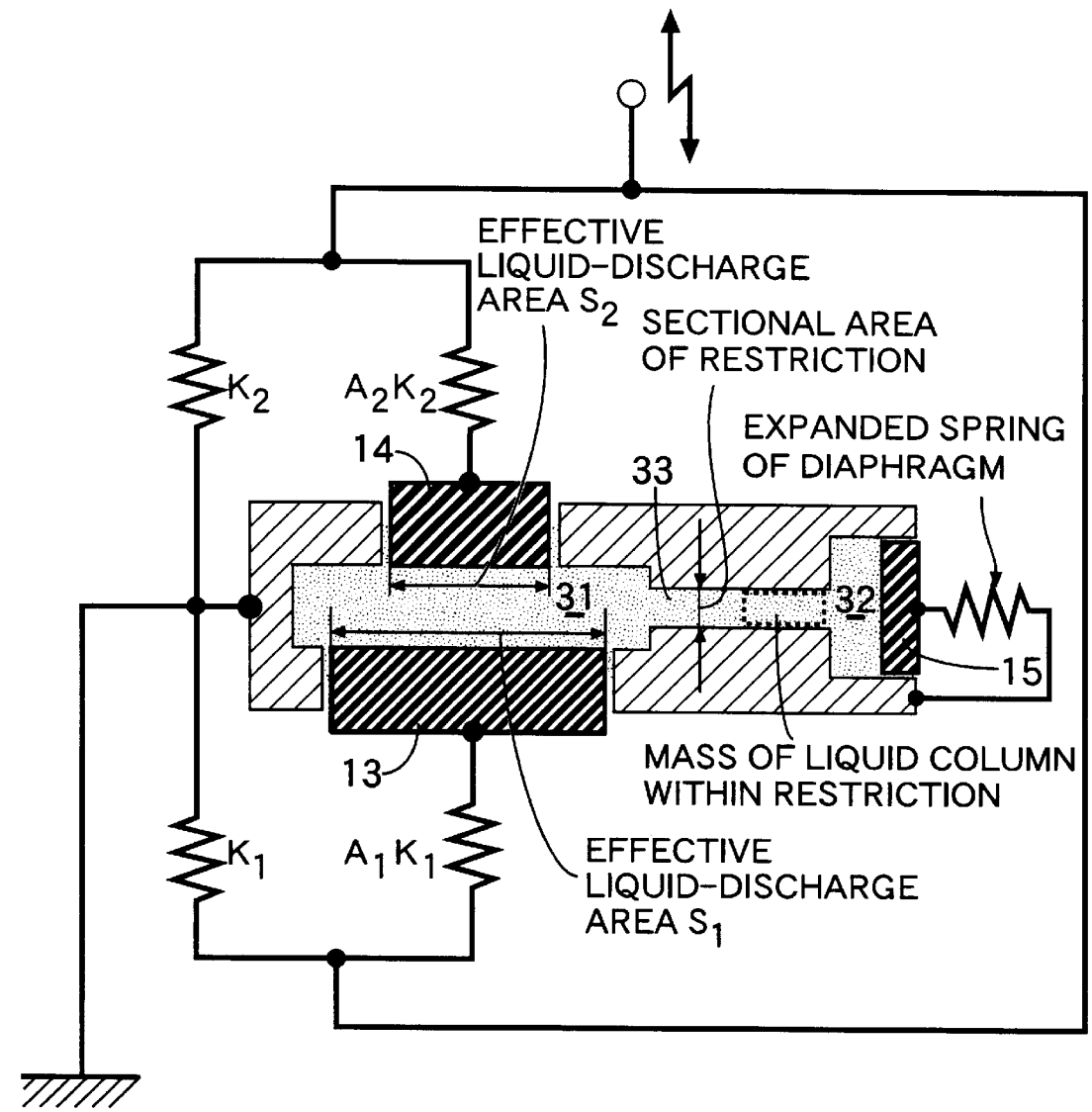

As can be seen by reference to the structural view in FIG. 2 and the model diagram in FIG. 5 in combination, when vibration is inputted from a road surface to the wheel with the traveling of the vehicle, it is transmitted via the damper 7 to the liquid-encapsulated damper mount 8. A relative displacement is caused between the outer member 11 connected to the vehicle body 19 and the inner member 12 connected to the damper 7, thereby deforming the first and second elastomer members 13 and 14 connected to the outer and inner members 11 and 12. At this time, the effective liquid-discharge area $S_1$ of the first elastomer member 13 is set larger than the effective liquid-discharge area $S_2$ of the second elastomer member 14 and hence, for example, when the inner member 12 is moved upwards relative to the outer member 11, the volume of the first liquid chamber 31 is reduced, whereby the liquid forced out of the first chamber 31 flows through the restrictions 33 into the second liquid chamber 32, causing the volume of the second liquid chamber 32 to be increased by the upward deformation of the third elastomer member 15 comprising the diaphragm. On the other hand, when the inner member 12 is moved downwards relative to the outer member 11, the volume of the first liquid chamber 31 is increased, resulting in a decreased pressure in the first liquid chamber 31 and hence, the liquid in the second liquid chamber 32 flows through the restrictions 33 into the first liquid chamber 31, whereby the third elastomer member 15 comprising the diaphragm, is deformed downwards with a reduction in volume of the second liquid chamber 32.

When the first and second elastomer members 13 and 14 forcing out the liquid are replaced by pistons having the same discharge amount of liquid as those of the first and second elastomer members 13 and 14, the term "effective liquid-discharge area $S_1$, $S_2$," corresponds to the cross-sectional area of each of these pistons.

In this case, the dynamic spring constant of the first elastomer member 13 is represented by a sum of a static spring constant component $K_1$ and an expanded spring constant component $A_1 K_1$, and the dynamic spring constant of the second elastomer member 14 is represented by a sum of a static spring constant component $K_2$ and an expanded spring constant component $A_2 K_2$. The static spring constant components $K_1$ and $K_2$ correspond to static spring constants of the first and second elastomer members 13 and 14, respectively, in a state in which the liquid has been withdrawn from the liquid-encapsulated damper mount 8. The expanded spring constant components $A_1 K_1$ and $A_2 K_2$ correspond to spring constants corresponding to the deformation of the first and second elastomer members 13 and 14 with movement of the liquid filled in the liquid-encapsulated damper mount 8. The characters $A_1$ and $A_2$ are constants depending upon the shape of the first and second elastomer members 13 and 14, respectively.

Figure 6:
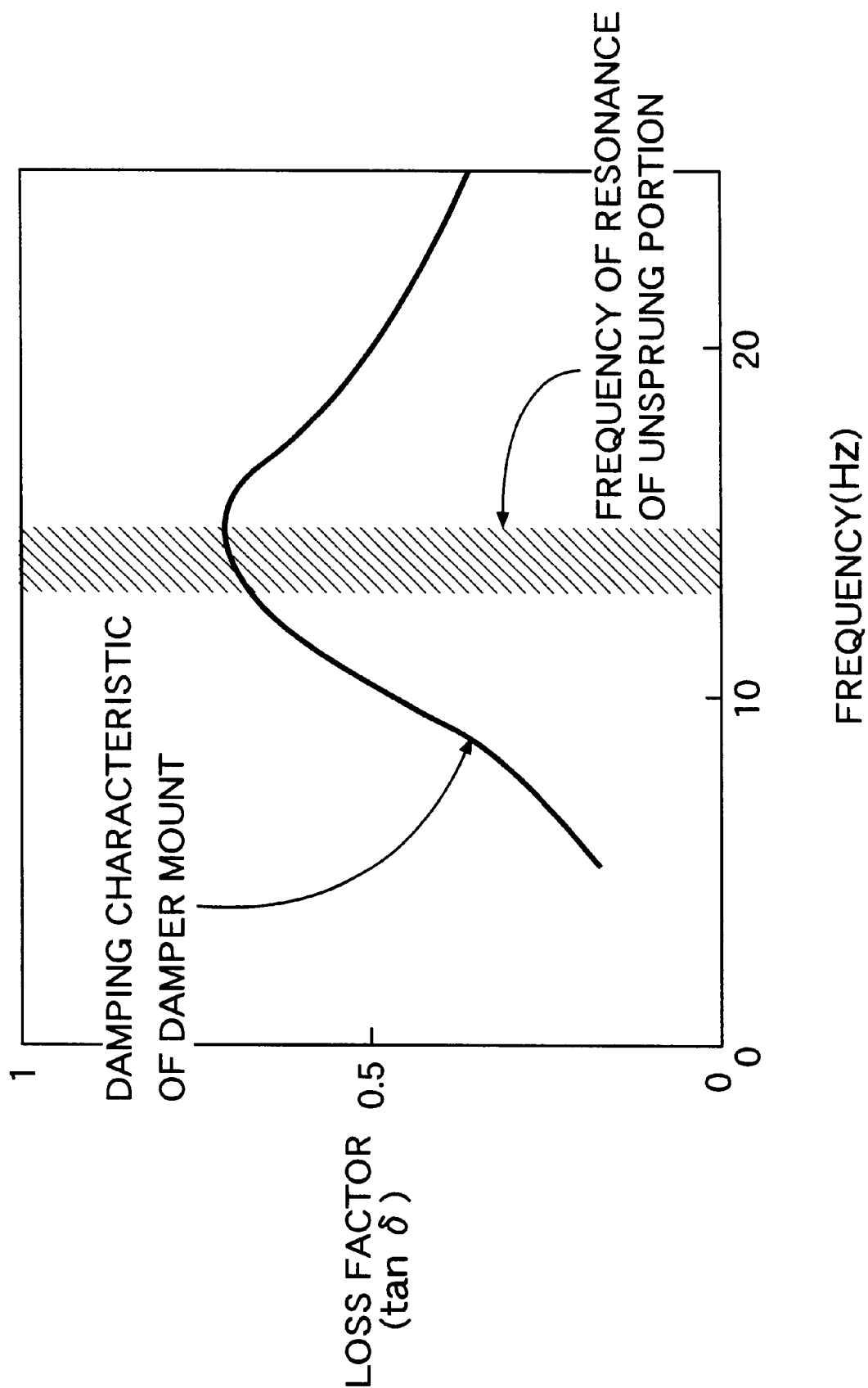

When the first and second elastomer members 13 and 14 are deformed due to the vibration inputted from the damper 7 to the liquid-encapsulated damper mount 8 in the above manner, a damping force is generated by the liquid column resonance phenomenon of the liquid in the restrictions 33. FIG. 6 shows the characteristic of a loss factor tan δ with respect to the frequency of the vibration inputted to the liquid-encapsulated damper mount 8. The system loss factor tan δ is the tangent of a loss angle δ between the stress and the strain, and is a parameter which is a gauge of damping of a system which is forcibly vibrated. As apparent from FIG. 6, the liquid-encapsulated damper mount 8 of the present embodiment is tuned, so that the maximum value of the loss factor tan δ has a peak value at an input frequency in a range of 13 Hz to 15 Hz, i.e., in the vicinity of a natural frequency of a lower spring portion of the suspension. The vicinity of the natural frequency indicates a range of $0.7 f_0$ to $1.4 f_0$, wherein $f_0$ represents the natural frequency.

Therefore, when a load of a very low speed is inputted to the damper 7 during traveling of the vehicle on a relatively flat paved road surface, a sufficient damping force can be generated at the liquid-encapsulated damper mount 8, even if a sufficient damping is not obtained at the hydraulic valve of the damper 7 for the above-described reason, thereby preventing the resonance of the lower spring portion of the suspension to enhance the riding comfort.

Figure 14:
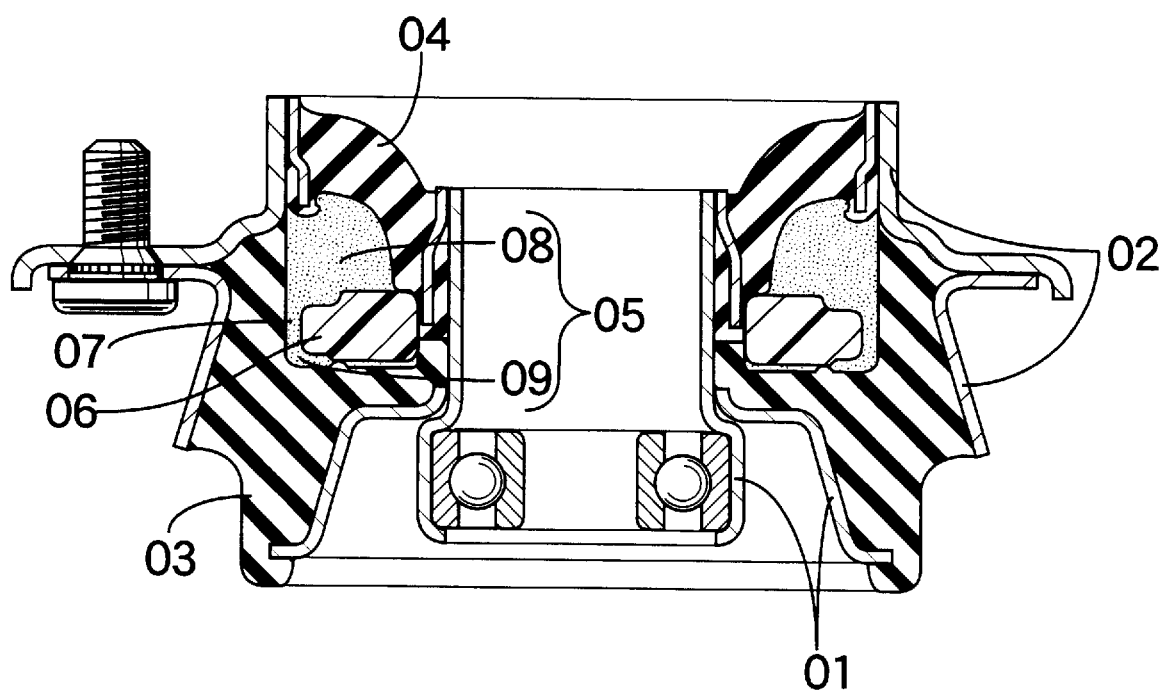
FIG. 14 is a vertical cross-sectional view of vibration systems of a conventional damper and a conventional damper mount.
Figure 15:
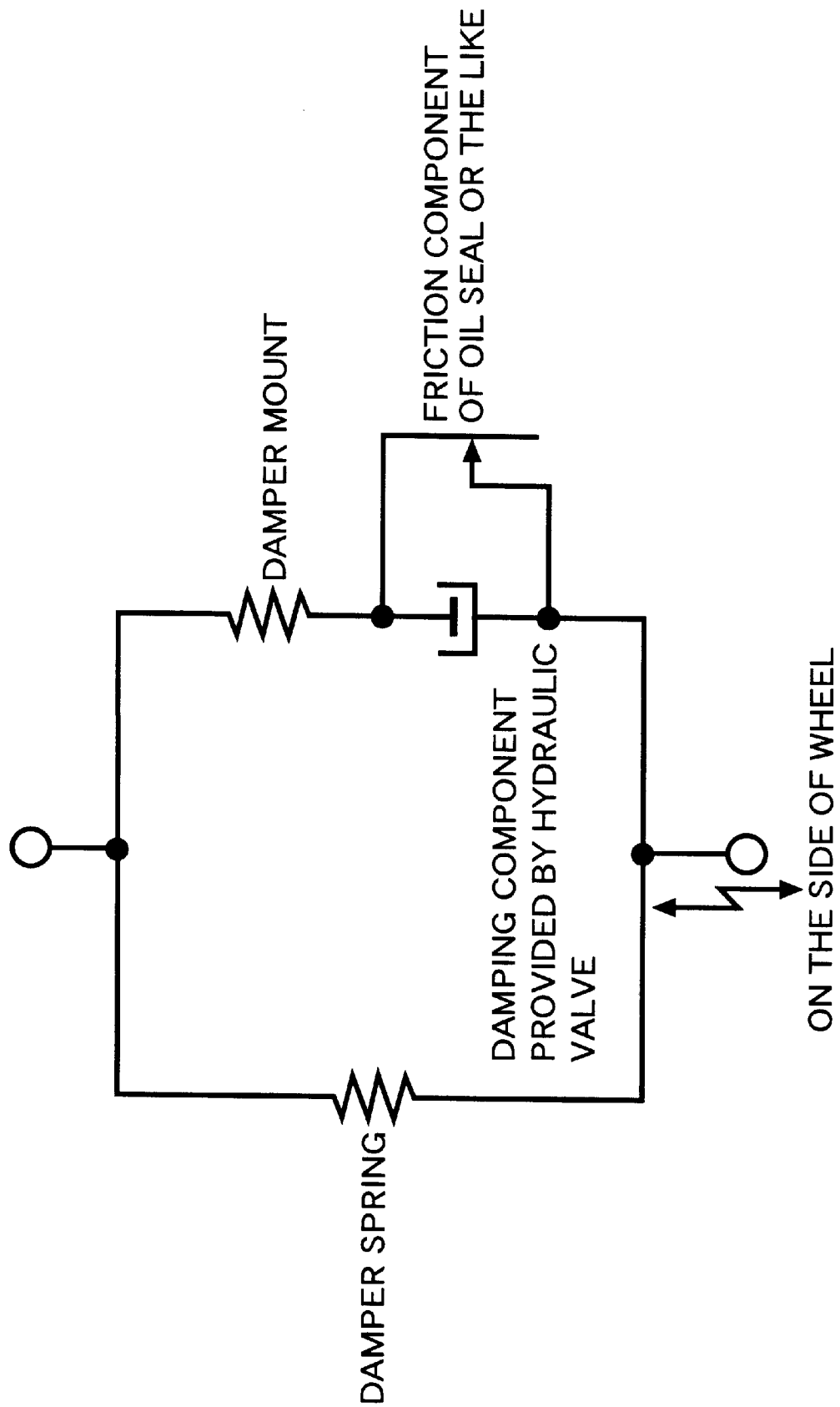
FIG. 15 is a model diagram of the vibration system of the prior art liquid-encapsulated damper mount shown in FIG. 14.

To ensure that the peak value of the loss factor tan δ of the liquid-encapsulated damper mount 8 is provided at an input frequency in a range of 13 Hz to 15 Hz, it is required that the cross-sectional area of the restriction 33 is set to a small value and stabilized. If the restriction is defined in an elastomer member as described with reference to FIG. 14, the cross-sectional area of the restriction is changed when a load in an oblique direction is inputted from the damper to the liquid-encapsulated damper mount. For this reason, the restriction of a small cross-sectional area cannot be ensured in a stabilized state. According to the embodiment of the present invention, however, the restrictions 33 are defined in abutment faces of the inner member 12 and the ring member 26, made of a metal, and therefore, the cross-sectional areas of the restrictions 33 can be maintained constant, irrespective of the direction of inputting of the load and the deformation of the first and second elastomer members 13 and 14, and a sufficient damping force can be generated in the vicinity of the resonance frequency of an unsprung portion of the suspension.

Figure 7:
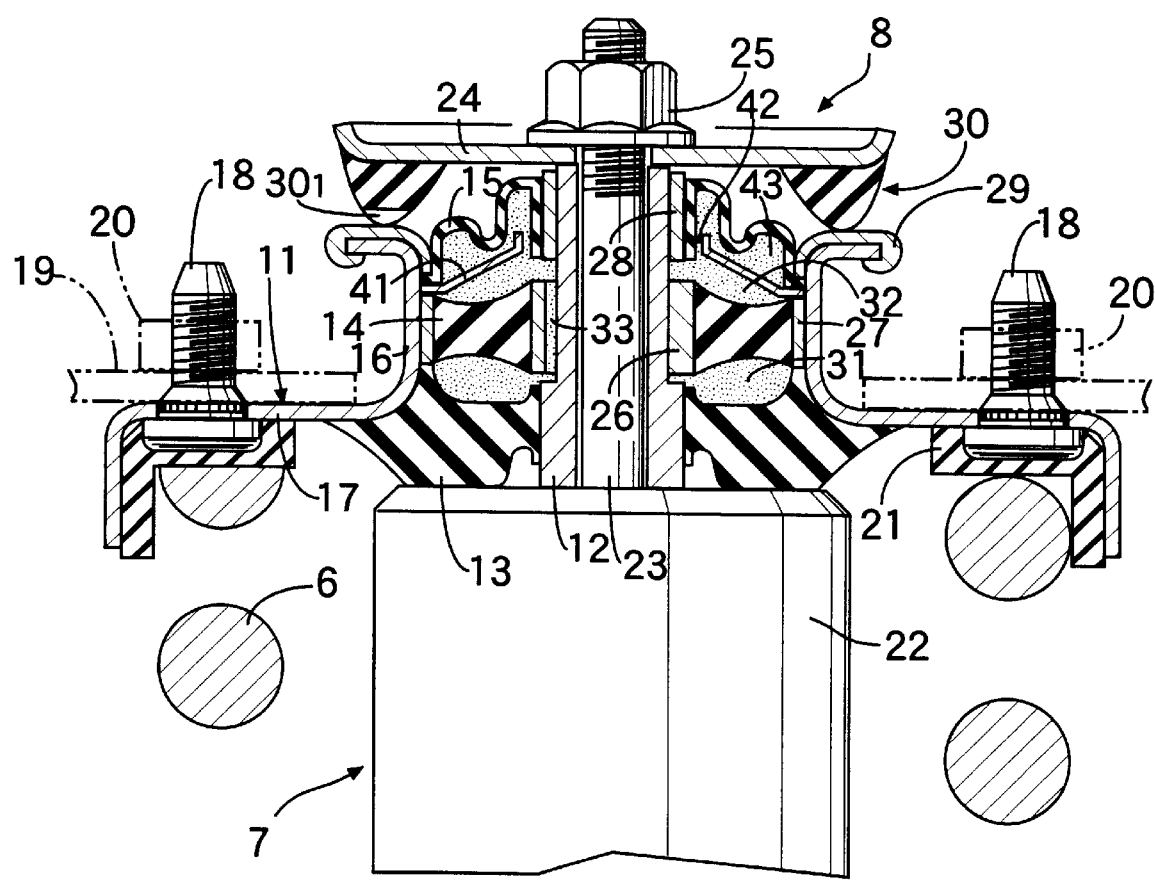
FIG. 7 is a vertical cross-sectional view of a liquid-encapsulated damper mount according to a second embodiment of the present invention.
Figure 11:
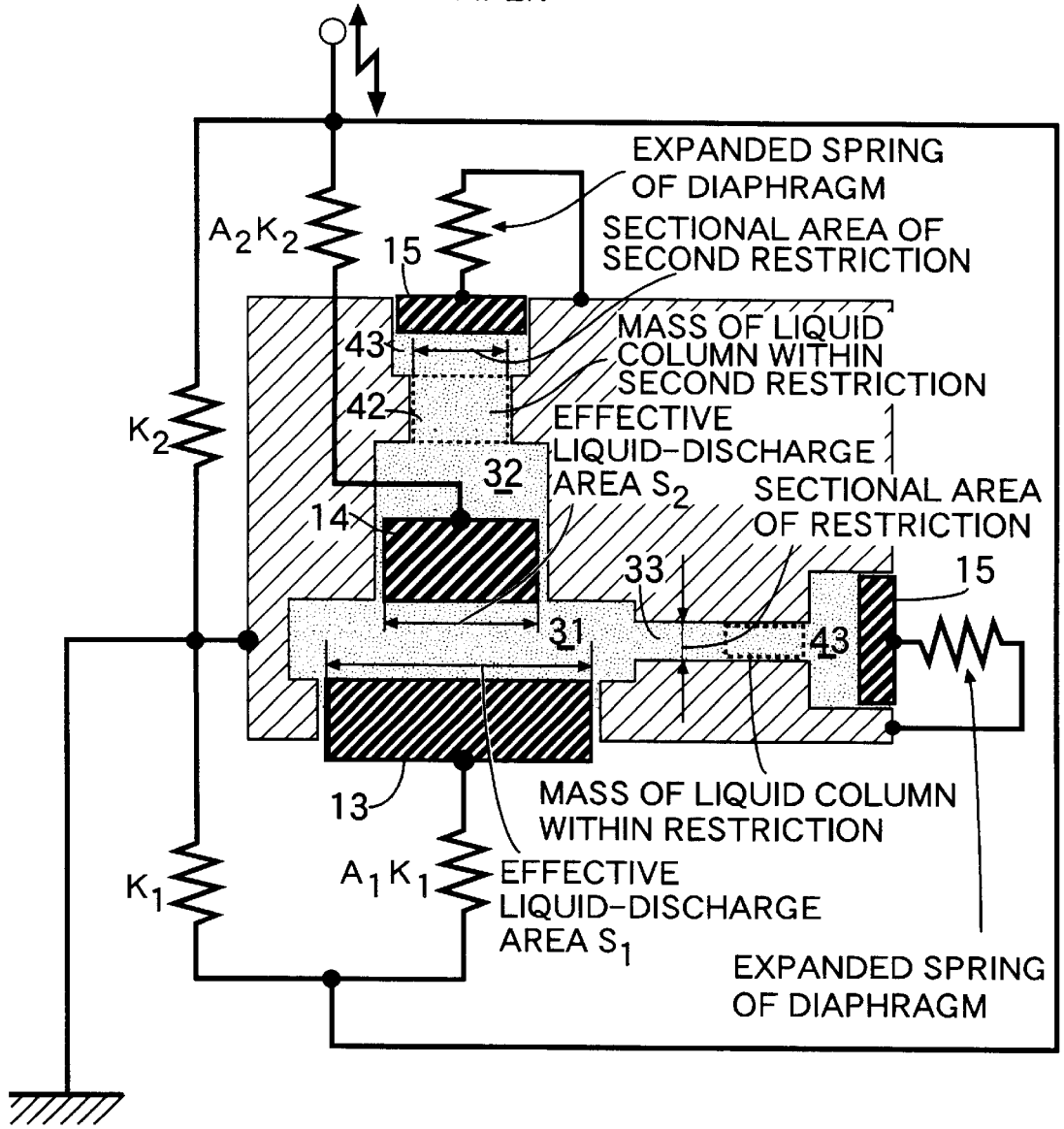
FIG. 11 is a model diagram of the vibration system of each of the liquid-encapsulated damper mounts according to the second, third, fourth and fifth embodiments.

A second embodiment of the present invention will now be described with reference to FIGS. 7 and 11.

As can be seen from the comparison with the first embodiment described with reference to FIG. 2, the second embodiment includes a metal plate 41 fixed at it outer periphery to two ring members 28 and 29. A second annular restriction 42 is defined between an inner periphery of the metal plate 41 and the third elastomer member 15. A second liquid chamber 32 is defined between the metal plate 41 and the second elastomer member 14 below the second restriction 42, and a third liquid chamber 43 is defined between the metal plate 41 and the third elastomer member 15 above the second restriction 42.

Figure 8:
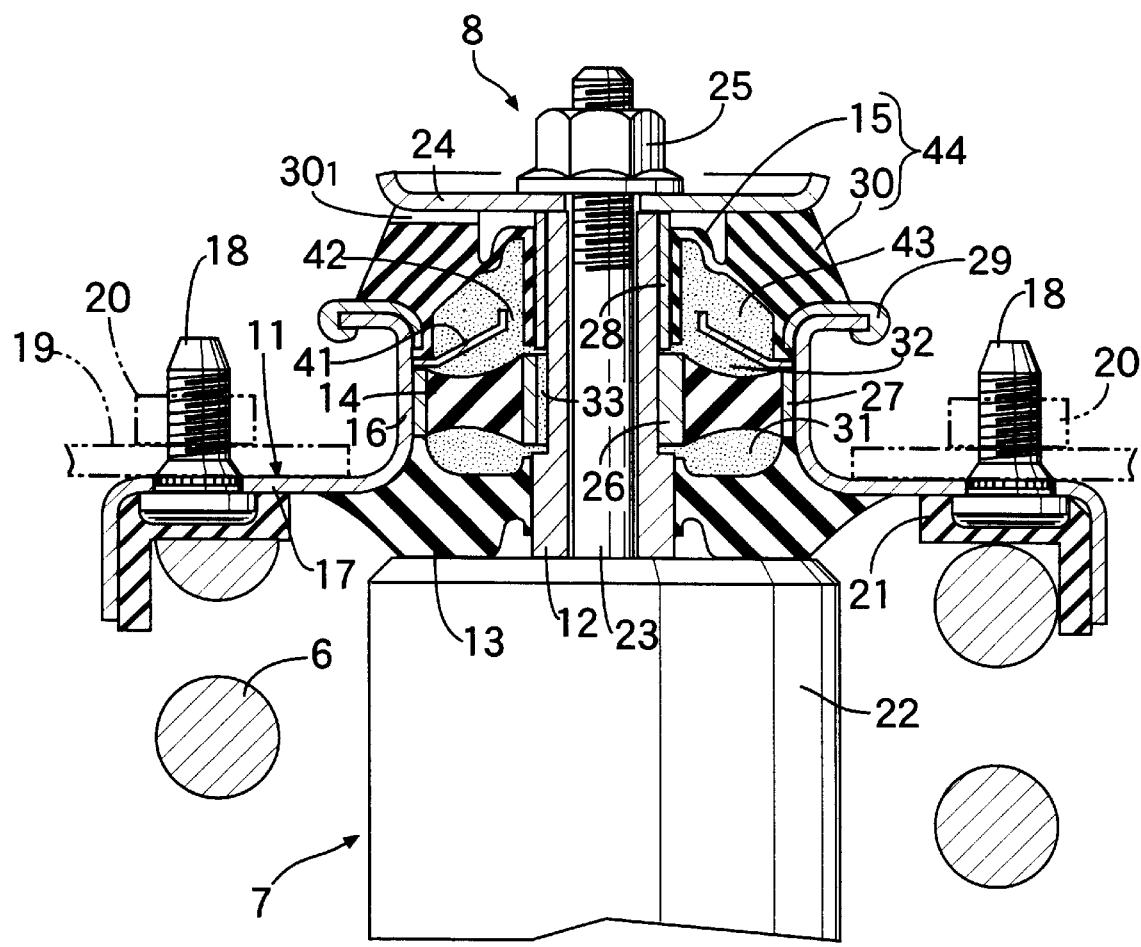
FIG. 8 is a vertical cross-sectional view of a liquid-encapsulated damper mount according to a third embodiment of the present invention.

A third embodiment of the present invention will now be described with reference to FIGS. 8 and 11.

The third embodiment includes a fourth elastomer member 44 comprising a third elastomer member 15 similar to that in the second embodiment described with reference to FIG. 7 and a stopper 30, which are formed integrally with each other. The stopper 30 of the fourth elastomer member 44 is fixed to the stopper plate 24 and the ring member 29 by vulcanization and adhering, and the third elastomer member 15 comprising the diaphragm is fixed to the ring member 28 by vulcanization and adhering. Even in the third embodiment, the second and third liquid chambers 32 and 43 defined below and above the metal plate 41 communicate with each other through the second annular restriction 42. By forming the third elastomer member 15 and the stopper integrally with each other in the above manner, a reduction in number of parts or components can be provided.

Figure 9:
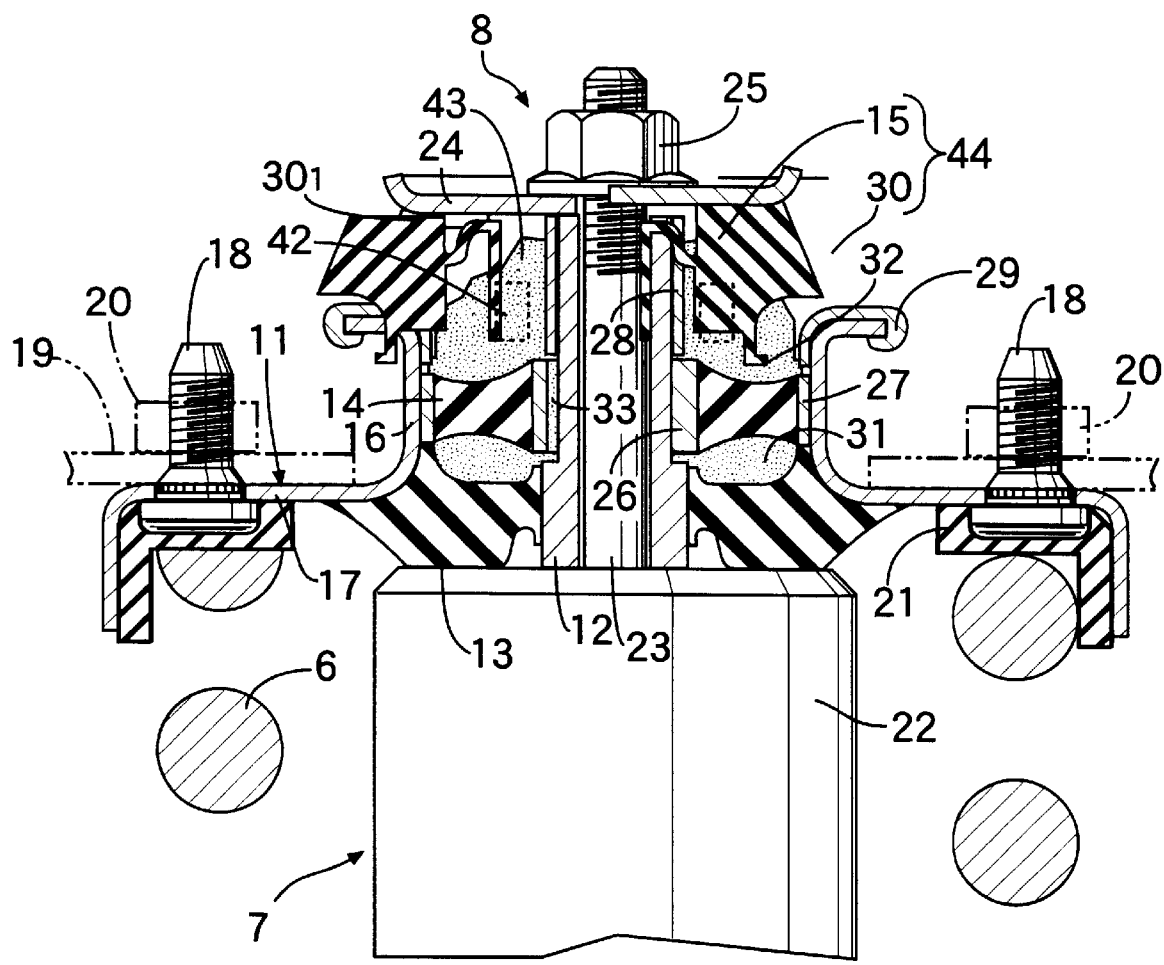
FIG. 9 is a vertical cross-sectional view of a liquid-encapsulated damper mount according to a fourth embodiment of the present invention.

A fourth embodiment of the present invention will now be described with reference to FIGS. 9 and 11.

In the fourth embodiment, the metal plate 41 is omitted from the third embodiment described with reference to FIG. 8, and an area sandwiched between the lower second liquid chamber 32 and the upper third liquid chamber 43 (i.e., an area enclosed by a dashed line in FIG. 9) functions as a second restriction 42.

A fifth embodiment of the present invention will now be described with reference to FIGS. 10 and 11.

As can be seen from the comparison with the first embodiment described with reference to FIG. 2, the fifth embodiment includes a fifth elastomer member 47, and ring members 45 and 46, fixed to inner and outer peripheries of the fifth elastomer member 47 by vulcanization and adhering. The fifth elastomer member 47 is fixed to an upper portion of the second elastomer member 14 by press-fitting the ring members 45 and 46 into the inner and outer members 12 and 11, respectively. A plurality of second restrictions 42 are defined in the fifth elastomer member 47, and the second liquid chamber 32 below the fifth elastomer member 47 and the third liquid chamber 43 above the fifth elastomer member 47 communicate with each other through the second restrictions 42.

With the above-described second, third, fourth and fifth embodiments, the restrictions 33 generate a damping force similar to that in the first embodiment, whereby the resonance of an unsprung portion of the suspension can be prevented to enhance the riding comfort, and also the noise in a load noise range (a range of input frequency of 200 Hz to 500 Hz) and a drumming range (a range of input frequency of 40 Hz to 80 Hz) can be reduced.

More specifically, when the vibration inputted from a road surface to a wheel as the vehicle travels, is transmitted via the damper 7 to the liquid-encapsulated damper mount 8, the first elastomer member 13 connected to the outer and inner members 11 and 12 of the liquid-encapsulated damper mount 8 is deformed, thereby causing the liquid to flow between the first and second liquid chambers 31 and 32 and the third liquid chamber 43 which are connected to each other through the second restriction 42. At this time, because the liquid column resonance frequency of the liquid in the second restriction 42 is set in the load noise range of 200 Hz to 500 Hz and the drumming range of 40 Hz to 80 Hz, the dynamic spring constant of the liquid-encapsulated damper mount 8 in such range can be reduced to reduce the load noise.

Especially, with the second, third and fourth embodiments (see FIGS. 7 to 9), the second restriction 42 is defined around the inner periphery of the metal plate 41 (in the second and third embodiments), or around the inner periphery of the fourth elastomer member 44 (in the fourth embodiment) and hence, when the total cross-sectional area of the second restriction 42 is uniform, the radial clearance of the second restriction 42 can be increased, as compared with a case where the second restriction 42 is defined around the outer periphery of the metal plate 41 or around the outer periphery of the fourth elastomer member 44. As a result, when a load in an oblique direction is inputted from the damper 7, the elimination of the clearance can be prevented to avoid a sudden change in total cross-sectional area of the second restriction 42.

With the fifth embodiment (see FIG. 10), the second restrictions 42 are defined through a radially intermediate portion of the fifth elastomer member 47 and hence, even when a load in an oblique direction is inputted from the damper 7, the crushing of the second restrictions 42 can be suppressed to the minimum to maintain the total cross-sectional area substantially constant.

Figure 12:
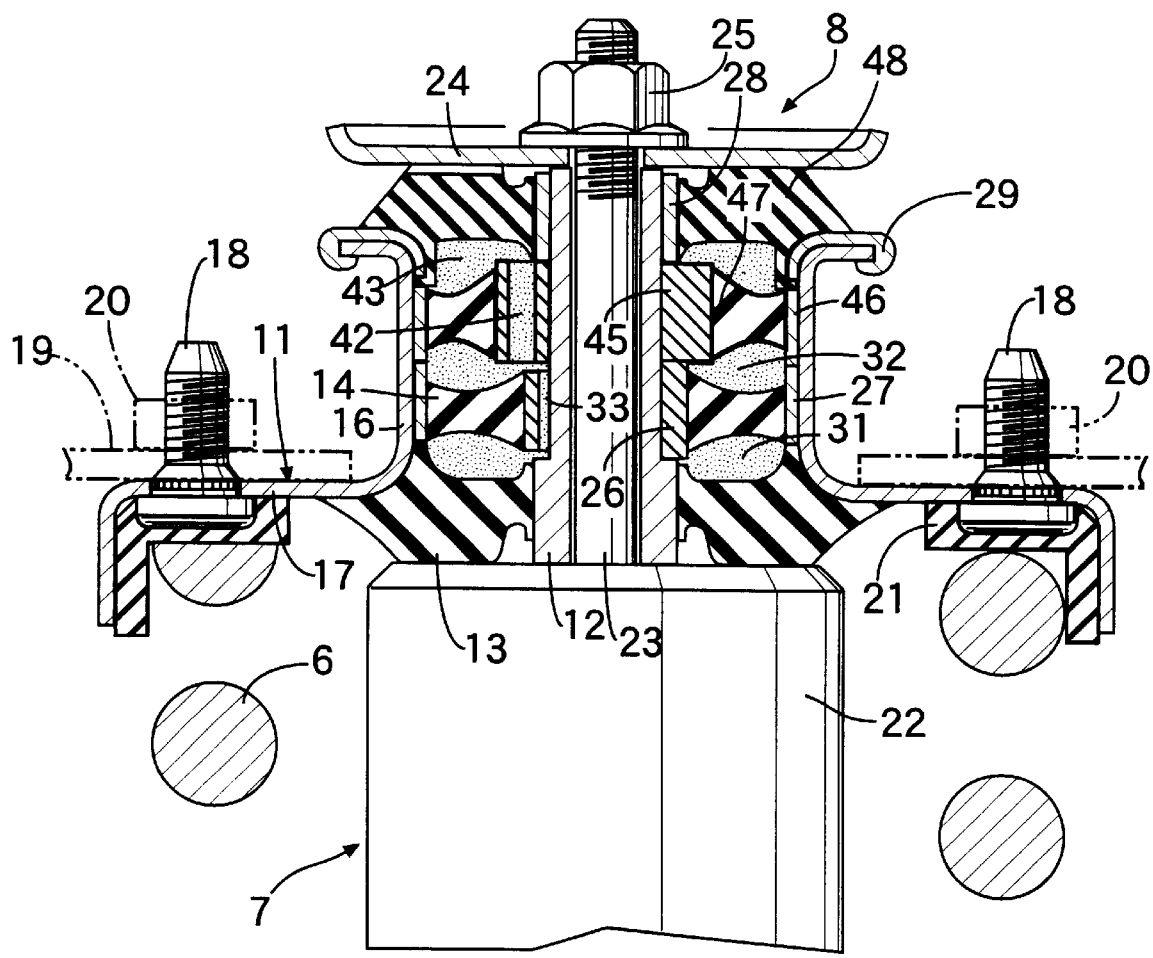
FIG. 12 is a vertical cross-sectional view of a liquid-encapsulated damper mount according to a sixth embodiment of the present invention.
Figure 13:
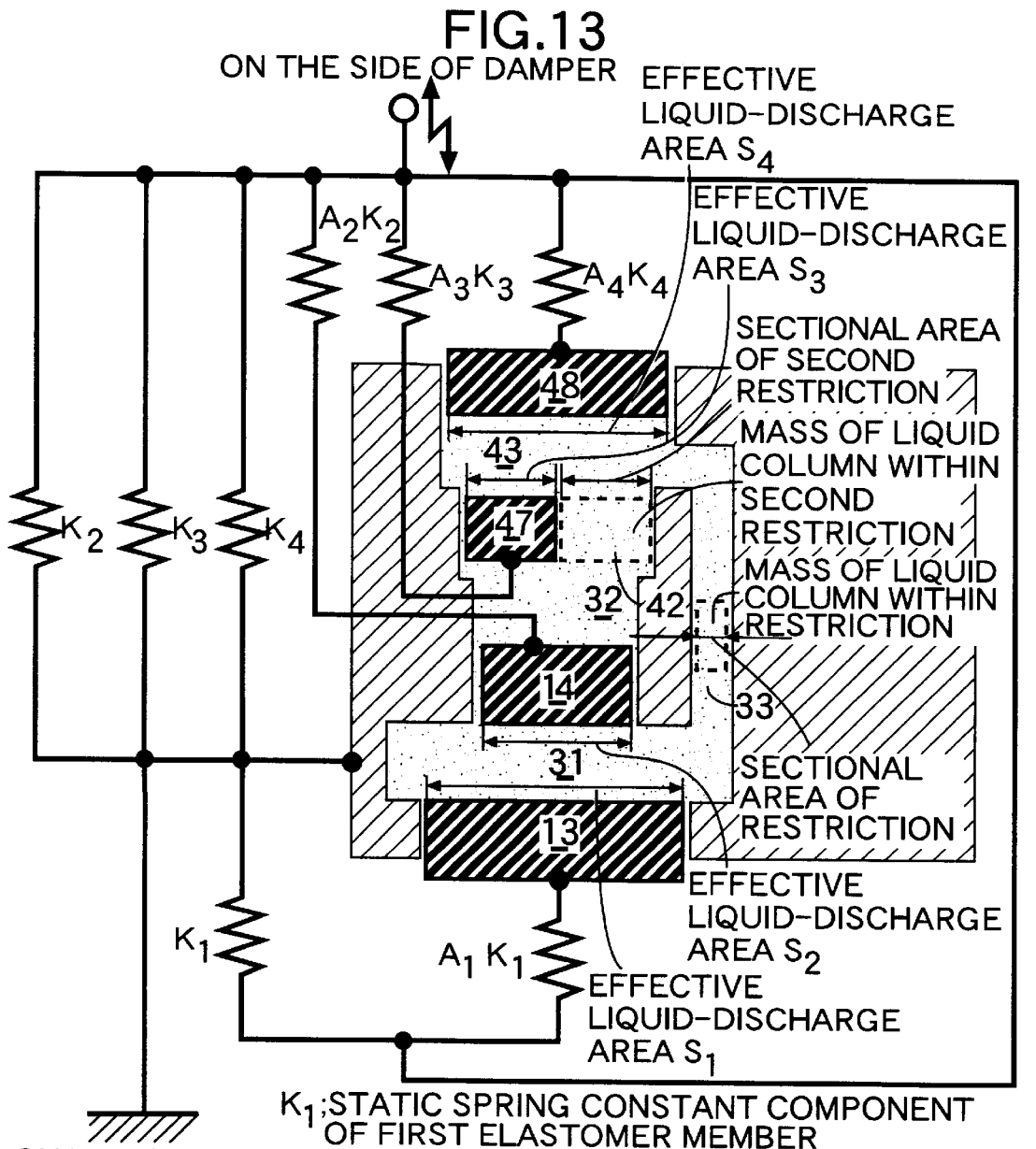
FIG. 13 is a model diagram of a vibration system of the liquid-encapsulated damper mount according to the sixth embodiment.

A sixth embodiment of the present invention will now be described with reference to FIGS. 12 and 13.

Figure 10:
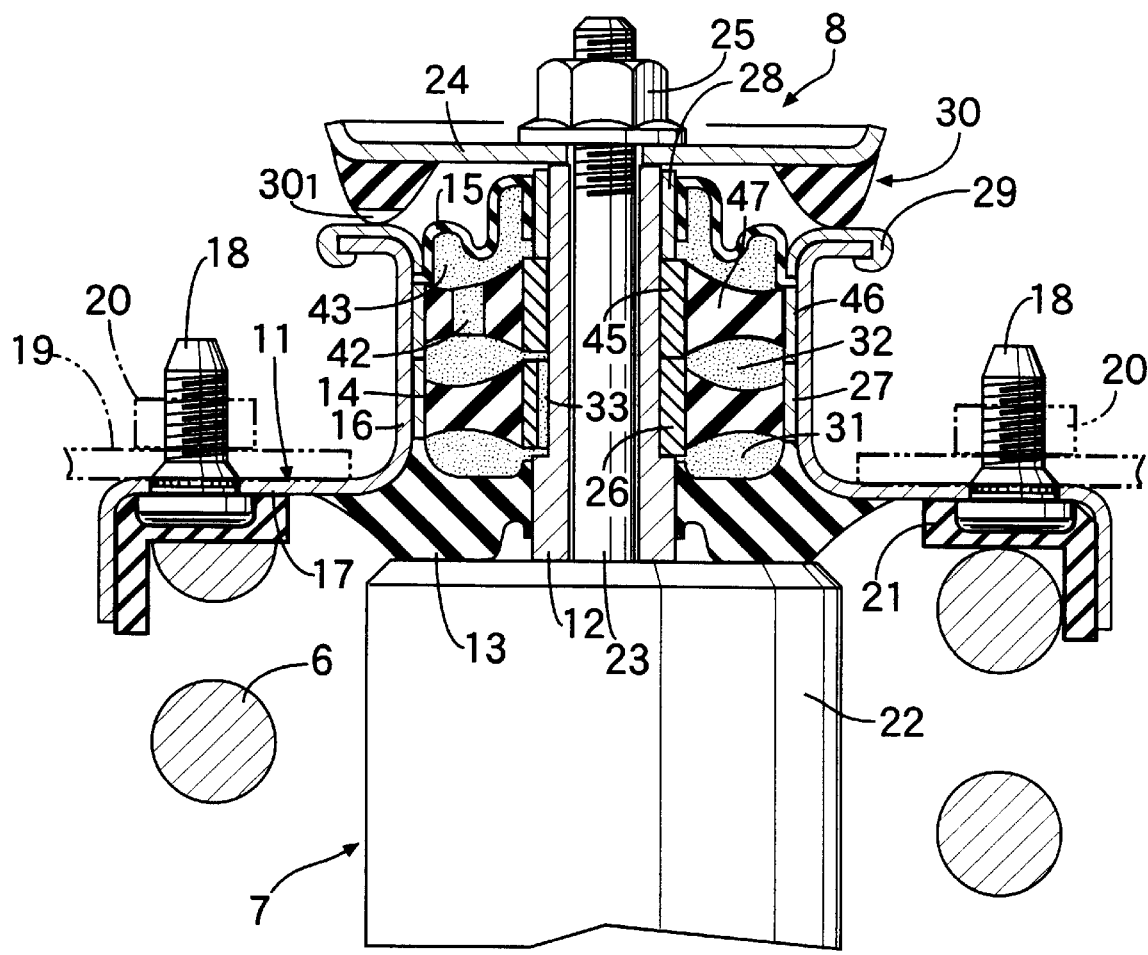
FIG. 10 is a vertical cross-sectional view of a liquid-encapsulated damper mount according to a fifth embodiment of the present invention.

The sixth embodiment is an improvement of the fifth embodiment shown in FIG. 10. Specifically, the second restriction 42 in the fifth embodiment is defined through the fifth elastomer member 47, whereas a second restriction in the sixth embodiment is defined through a thicker ring member 45 which is a rigid member and hence, the change in the cross-sectional area of the second restriction 42 can be reliably prevented. In addition, the third elastomer member 15 in the fifth embodiment is formed of the diaphragm, whereas the sixth embodiment includes a sixth elastomer member 48 far thicker than the diaphragm. As a result, the change in pressure of the liquid in the third liquid chamber 43 relative to the inputting of the vibration in the load noise range can be enhanced, and the liquid column resonance effect by the second restriction can be further enhanced.

The restrictions 33 are defined by the grooves formed around the inner periphery of the ring member 26 in the disclosed embodiments, but they may be, of course, defined by grooves formed around the outer periphery of the inner member 12, or by grooves formed in both the ring member 26 and the inner member 12. They may also be defined within any other rigid member.

In place of defining the restrictions 33 such that they extend through the rigid member, the restrictions 33 may be defined to extend vertically through the second elastomer member 14, partitioning the first and second liquid chambers 31 and 32 from each other. In this case, even if the second elastomer member 14 is deformed by inputting of a load, the change in cross-sectional area of the restrictions 33 defined to extend through the second elastomer member 14 is smaller, and the restrictions 33 cannot be crushed completely. Hence, an operational effect similar to that provided by the restrictions 33 in each of the disclosed embodiments can be achieved.

Although the embodiments of the present invention have been described in detail, it will be understood that the present invention is not limited to the above-described embodiments, and various modifications in design may be made without departing from the spirit and scope of the present invention defined in claims.

What is claimed is:

1. A liquid-encapsulated damper mount comprising an outer member fixed to a vehicle body, an inner member fixed to an upper end of a damper for suspending a wheel of the vehicle, an elastomer member connecting said inner member and said outer member for supporting the upper end of said damper on said vehicle body, a first liquid chamber and a second liquid chamber defined within said elastomer member and a rigid member having a restriction therein for providing communication between said first and second liquid chambers, wherein said rigid member comprises said inner member and a ring member press fitted over the outer periphery of said inner member, wherein said ring member is connected to an inner periphery of said elastomer member, and wherein said restriction is defined between mutually abutting cylindrical surfaces of said inner member and said ring member.

2. A liquid-encapsulated damper mount according to claim 1, wherein a system loss factor is set, such that the loss factor has a peak value when the frequency of vibration inputted from the wheel is in the vicinity of the natural frequency of an unsprung portion of a suspension.

3. A liquid-encapsulated damper mount according to claim 1, further including a stopper, contacting said outer member, for limiting the maximum relative displacement of said outer member and said inner member.

4. A liquid-encapsulated damper mount according to claim 1, wherein said elastomer member comprises a first elastomer member, a second elastomer member, and a third elastomer member, wherein said first liquid chamber is formed between said first and second elastomer members and said second liquid chamber is located between said second and third elastomer members.

5. A liquid-encapsulated damper mount according to claim 4, wherein said third elastomer member is a diaphragm.

6. A liquid-encapsulated damper mount according to claim 5, wherein a stopper member is integrally formed with said third elastomer member.

7. A liquid-encapsulated damper mount according to claim 5, wherein a stopper member is integrally formed with said third elastomer member for forming a third liquid chamber and wherein a second restriction is formed by said stopper member and said third elastomer, between said second and third liquid chambers.

8. A liquid-encapsulated damper mount as set forth in claim 4, wherein said ring member is connected to the inner periphery of said second elastomer member.

9. A liquid-encapsulated damper mount as set forth in claim 8, further including a plate member positioned between said second and third elastomer members, wherein a third liquid chamber is formed between said plate and said third elastomer member and wherein a second restriction is formed between said second liquid chamber and said third liquid chamber.

10. A liquid-encapsulated damper mount according to claim 4, further including a diaphragm and a second restriction, wherein a third liquid chamber is formed between said third elastomer member and said diaphragm and wherein said second restriction is formed in said third elastomer and communicates between said second and third liquid chambers.

11. A liquid-encapsulated damper mount according to claim 4, further including a fourth elastomer member for limiting the maximum relative displacement of said outer member and said inner member, a second ring member positioned between said inner member and said third elastomer, and a second restriction in said second ring member, wherein said second restriction communicates between said second and third liquid chambers.

12. A liquid-encapsulated damper mount according to claim 1, wherein said rigid member of said elastomer member is annular and said restriction has a predetermined width in a circumferential direction of said rigid member.

13. A liquid-encapsulated damper mount according to claim 12, wherein said restriction includes a plurality of separate restrictions.

14. A liquid-encapsulated damper mount according to claim 13, wherein said separate restrictions are separated from each other equidistantly in said circumferential direction of said rigid member.

15. A liquid-encapsulated damper mount comprising an outer member fixed to a vehicle body, an inner member fixed to an upper end of a damper for suspending a wheel of a vehicle, the outer and inner members being connected to each other by an elastomer member to support the upper end of said damper on said vehicle body, and a first liquid chamber and a second liquid chamber which are defined within the elastomer to communicate with each other through a restriction, said restriction being defined to penetrate through a rigid member, wherein said rigid member comprises said inner member and a ring member which is press fitted over an outer periphery of said inner member and connected to an inner periphery of said elastomer member, and said restriction is defined by a groove formed in one of mutually abutting cylindrical surfaces of said inner member and said ring member.

16. A liquid-encapsulated damper mount according to claim 15, wherein a system loss factor is set, so that it has a peak value when the frequency of a vibration inputted from the wheel is in the vicinity of a natural frequency of an unsprung portion of a suspension.

17. A liquid-encapsulated damper mount according to claim 15, further including a stopper formed integrally with said elastomer member for limiting the maximum relative displacement of said outer member and said inner member.

\* \* \* \* \*